US00RE34854E

United States Patent [19]

Shank, Jr.

[11] E Patent Number: Re. 34,854

[45] Reissued Date of Patent: Feb. 14, 1995

[54] FAN NOZZLE

[75] Inventor: James D. Shank, Jr., Vestal, N.Y.

[73] Assignee: Church & Dwight Co., Inc., Princeton, N.J.

[21] Appl. No.: 201,886

[22] Filed: Feb. 24, 1994

Related U.S. Patent Documents

Reissue of:

[64] Patent No.: 5,265,383
Issued: Nov. 30, 1993
Appl. No.: 979,300
Filed: Nov. 20, 1992

[51] Int. Cl.[6] ..... B24C 5/04

[52] U.S. Cl. ..... 451/102; 451/90

[58] Field of Search ..... 51/439, 427, 410, 319, 51/320; 299/154, 597, 592, 589

[56] References Cited

U.S. PATENT DOCUMENTS

| | | | |
|---|---|---|---|
| 561,483 | 6/1896 | Bryce | 51/439 |
| 2,038,249 | 4/1936 | Stoddy . | |
| 2,605,596 | 8/1952 | Uhri . | |
| 2,606,073 | 8/1952 | Uhri | 299/154 |
| 2,900,851 | 8/1959 | Rutledge | 51/439 |
| 3,032,930 | 5/1962 | Williams . | |
| 3,628,627 | 12/1971 | Williams | 51/439 |
| 3,662,497 | 5/1972 | Thompson | 51/439 |
| 4,633,623 | 1/1987 | Spitz | 51/439 |
| 4,817,342 | 4/1989 | Martin | 51/439 |
| 4,843,770 | 7/1989 | Crane et al. | 51/439 |
| 4,962,891 | 10/1990 | Layden | 239/597 |

OTHER PUBLICATIONS

Model 44A Stainless Steel Flat Nozzle, Alpheus Cleaning Technologies, Rancho Cucamonga, Calif. 91730.

*Primary Examiner*—Maurina T. Rachuba
*Attorney, Agent, or Firm*—Charles B. Barris

[57] ABSTRACT

A blast nozzle is provided for cleaning a surface with a blast media which is softer and more friable than sand such as sodium bicarbonate and which comprises an inlet section which contains a passageway which converges substantially along only one [planar axis] *direction* to a rectangular venturi orifice and a fan-shaped outlet section which contains a passageway which diverges along substantially only one [planar axis] *direction* perpendicular to the [planar axis] *direction* of convergence of the converging passageway, the inlet passageway being [greater] *longer* than twice the diameter of the inlet of the nozzle so as to provide streamlined flow and reduce turbulent flow of the friable blast media in the blast nozzle. The passageways in the blast nozzle are formed by opposed modular structures which are releasably secured to the nozzle and can be changed to change the length and angle of convergence and expansion ratio of the nozzle.

21 Claims, 4 Drawing Sheets

FAN NOZZLE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to blast nozzles and a process for removing adherent material such as paint, scale dirt, grease and the like from solid surfaces with abrasive particles propelled by air. In particular, the present invention is directed to a novel blast nozzle which is shaped to provide uniform flow of blast media therethrough and is particularly useful in blasting with a friable and relatively soft abrasive media such as sodium bicarbonate.

2. Description of the Prior Art

In order to clean a solid surface so that such surface can again be coated such as, for example, to preserve metal against deterioration, remove graffiti from stone or simply to degrease a solid surface such as surfaces contacting food or building structures which contain food serving or food processing operations, it has become common practice to use an abrasive blasting technique wherein abrasive particles are propelled by a high pressure fluid against the solid surface in order to dislodge previously applied coatings, scale, dirt, grease or other contaminants. Various abrasive blasting techniques have been utilized to remove the coatings, grease and the like from solid surfaces. Thus, blasting techniques comprising dry blasting which involves directing the abrasive particles to a surface by means of pressurized air typically ranging from 30 to 150 psi, wet blasting in which the abrasive blast media is directed to the surface by a highly pressurized stream of water typically 3,000 psi and above, multi-step processes comprising dry or wet blasting and a mechanical technique such as sanding, chipping, etc. and a single step process in which both air and water are utilized either in combination at high pressures to propel the abrasive blast media to the surface as disclosed in U.S. Pat. No. 4,817,342, or in combination with relatively low pressure water used as a dust control agent or to control substrate damage have been used. Water for dust control has been mixed with the air either internally in the blast nozzle or at the targeted surface to be cleaned and such latter process, although primarily a dry blasting technique, is considered wet blasting inasmuch as media recovery and clean up is substantially different from that utilized in a purely dry blasting operation.

A typical dry blasting apparatus as well as a wet blasting apparatus which utilizes highly pressurized air to entrain, carry and direct the abrasive blast media to the solid surface to be treated and low pressure water for dust control comprises a dispensing portion in which the blast media typically contained in a storage tank is entrained in highly pressurized air, a flexible hose which carries the air/blast media mixture to the blast nozzle and which allows the operator to move the blast nozzle relative to the surface to be cleaned and the blast nozzle which accelerates the abrasive blast media and directs same into contact with the surface to be treated. The blast nozzle is typically hand-held by the operator and moved relative to the targeted surface so as to direct the abrasive blast media across the entire surface to be treated.

The blast media or abrasive particles most widely used for blasting surfaces to remove adherent material therefrom is sand. Sand is a hard abrasive which is very useful in removing adherent materials such as paint, scale and other materials from metal surfaces such as steel. While sand is a most useful abrasive for each type of blasting technique, there are disadvantages in using sand as a blast media. For one, sand, i.e., silica, is friable and upon hitting a metal surface will break into minute particles which are small enough to enter the lungs. These minute silica particles pose a substantial health hazard. Additionally, much effort as needed to remove the sand from the surrounding area after completion of blasting. Still another disadvantage is the hardness of sand itself. Thus, sand cannot readily be used as an abrasive to remove coatings from relatively soft metals such as aluminum or any other soft substrate such as plastic, plastic composite structures, concrete or wood, as such relatively soft substrates can be excessively damaged by the abrasiveness of sand. Moreover, sand cannot be used around moving parts of machinery inasmuch as the sand particles can enter bearing surfaces and the like.

An alternative to non-soluble blast media such as sand, in particular, for removing adherent coatings from relatively soft substrates such as softer metals as aluminum, composite surfaces, plastics, concrete and the like is sodium bicarbonate. While sodium bicarbonate is softer than sand, it is sufficiently hard to remove coatings from aluminum surfaces and as well remove other coatings including paint, dirt, and grease from non-metallic surfaces without harming the substrate surface. Sodium bicarbonate is not harmful to the environment and is most advantageously water soluble such that the particles which remain subsequent to blasting can be simply washed away without yielding environment harm. Unfortunately, sodium bicarbonate, typically used as particles having average diameters of from about 50 to 1,000 microns, is even more friable than sand and breaks into smaller particles as it traverses the flexible supply hose which carries the blast media and pressurized air to the blast nozzle and, as well, breaks into pieces as the blast media comes into contact with the internal surfaces of the blast nozzle prior to being propelled to the target surface.

Sodium bicarbonate blast media has been propelled by a standard round nozzle which comprises a converging hollow conical inlet section, a venturi throat and a contiguous diverging hollow conical outlet section and which is typically used for blasting with sand. As above described, it has been found that the relatively light sodium bicarbonate blast media loses a substantial portion of its effectiveness due to the break up of the individual particles in the round nozzle. Moreover, it has been found that the individual particles of sodium bicarbonate are rounded during travel through the blast nozzle such that the sharp cutting edges are broken off, likely reducing the cutting action and effectiveness of the media for contaminant removal from the substrate. The conical shape of the converging and diverging sections of the round nozzle is believed to be one source of these problems. Thus, as the sodium bicarbonate blast media enters the nozzle from the supply hose and converges toward the venturi orifice and then expands subsequent to the venturi orifice, the individual particles of the blast media are believed to be directed not only in the longitudinal direction toward and away from the venturi orifice, but radially, literally bouncing along all of the surfaces of the conical sections. As the individual particles of sodium bicarbonate lose mass within the blast nozzle and, are not optimally accelerated through the nozzle due to the turbulent flow of misdirected particles, there consequently results a degradation in the productivity of the blasting operation. Accordingly, there is a need to provide a blast nozzle which can be used for blasting with sodium bicarbonate as the blast media and which will not yield the substantial loss of productivity found when using a round nozzle.

It would also be useful to change the conditions of blasting without having to use a different blast nozzle. Thus, standard round nozzles and other blast nozzles include venturi sections to accelerate the blast media from the nozzle that are passage-ways typically machined or cast such as in metal blast nozzles or pressed or molded as in ceramic nozzles and, thus, cannot be adjusted to accommodate different densities of blast media or changing on-site conditions. Inefficiencies are simply tolerated or a new nozzle with different properties is provided.

An attempt has been made to tailor a blast nozzle for use in blasting with abrasive media which is softer than sand such as plastic-pellets. This blast nozzle included a converging section, a throat and a diverging or expansion section in the shape of a fan which directed the blast media to the surface as a fan shaped stream of particles. The inventor found that the prototype fan nozzle was extremely inefficient in blasting with sodium bicarbonate. It is now believed that the inefficiencies that were found resulted from (1) a converging or inlet section which was not sufficiently long, it being slightly less than twice the diameter of the inlet which resulted in an excessively steep convergence and consequent turbulence in the blast media/air stream through the nozzle, (2) a rectangular venturi orifice which was wider than the diameter of the supply hose resulting in simultaneous expansion and convergence of the blast media/air stream and additional turbulence and (3) it could not be adjusted on-site inasmuch as the converging section was machined within the metal structure which formed the prototype nozzle. Thus, the geometry of the prototype blast nozzle is now believed to have resulted in a substantial amount of turbulent flow causing excessive contact of the particles of blast media with the walls of the nozzle. As found in using the round nozzle, the turbulent flow resulted in an uneven outlet flow and loss of velocity and mass with respect to the individual abrasive particles.

It is a primary objective of the present invention to provide a blast nozzle which is useful in blasting to remove contaminants, such as rust, coatings, dirt grease, etc. from a surface utilizing sodium bicarbonate as the blast media.

Another objective of the present invention is to provide a blast nozzle which has readily adjustable geometry to maintain optimum velocity of the blast media from the outlet of the blast nozzle, regardless of blast media type, size or density or changing on-site conditions.

SUMMARY OF THE INVENTION

In accordance with the present invention there is provided a blast nozzle particularly useful in blasting with soft and friable media such as sodium carbonate and which nozzle can be characterized as a fan nozzle. The fan nozzle comprises a continuous longitudinal passage-way comprising an inlet portion which converges in a single direction, a rectangular venturi throat or orifice and an outlet portion which diverges also in a single direction which is perpendicular to the direction of convergence of the inlet portion. The converging passage in the inlet portion is formed by opposed modular triangular ramps which can be removed and replaced with other ramps which are longer or shorter so as to maximize the speed of the blast media and adjust the blast nozzle to readily accommodate different types of blast media or operating conditions so as to maintain optimal productivity. The inlet portion of the fan nozzle is rigid, rectangular, and is sufficiently long that the length of the inlet portion of the blast nozzle is greater than twice the inside diameter of the blast nozzle inlet. The width of the orifice is the same size as the diameter of the inlet. The longer convergence and avoidance of immediate expansion as the blast media/air stream enters the nozzle provides improved stream-line flow, less turbulence and less mass loss in the individual abrasive particles. The outlet portion is also of modular construction comprising releasably attached upper and lower fan-shaped expansion sections which can be replaced to change the expansion ratio or angle of divergence of the nozzle and thus allows the nozzle to be adjusted to accommodate the specific media being used and changing on-site conditions.

If the blast nozzle is used with the preferred softer blast media, the fan nozzle can be made of relatively light materials of construction such as stainless steel, coated aluminum or even plastic or plastic or fiberglass composites as opposed to the hard metal and ceramic structures which form the standard round nozzle typically used for blasting with sand and which structures must be cast or molded by various types of high pressure techniques which makes the manufacture of such round nozzles cumbersome and expensive.

DETAILED DESCRIPTION OF THE INVENTION

Figure 1:
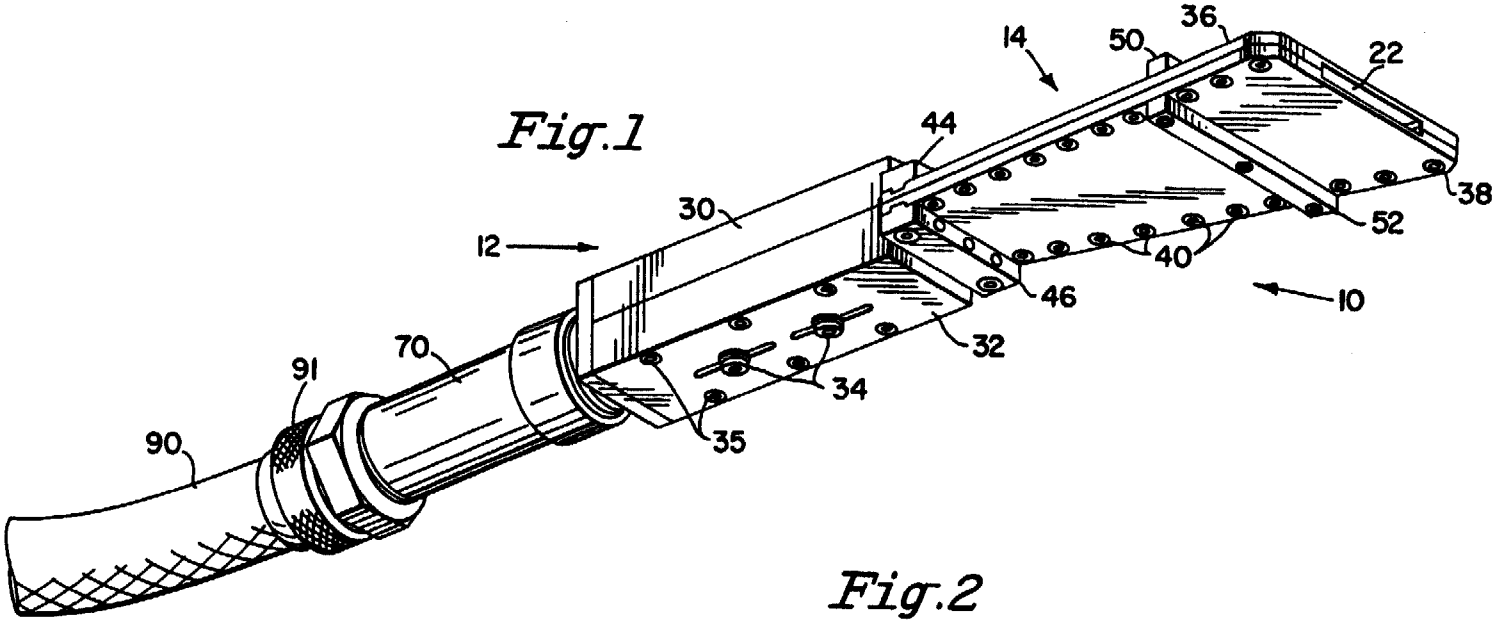
FIG. 1 is a bottom perspective view of the fan nozzle of the present invention including an inlet extension member which provides uniform flow of blast media to the nozzle.
Figure 2:
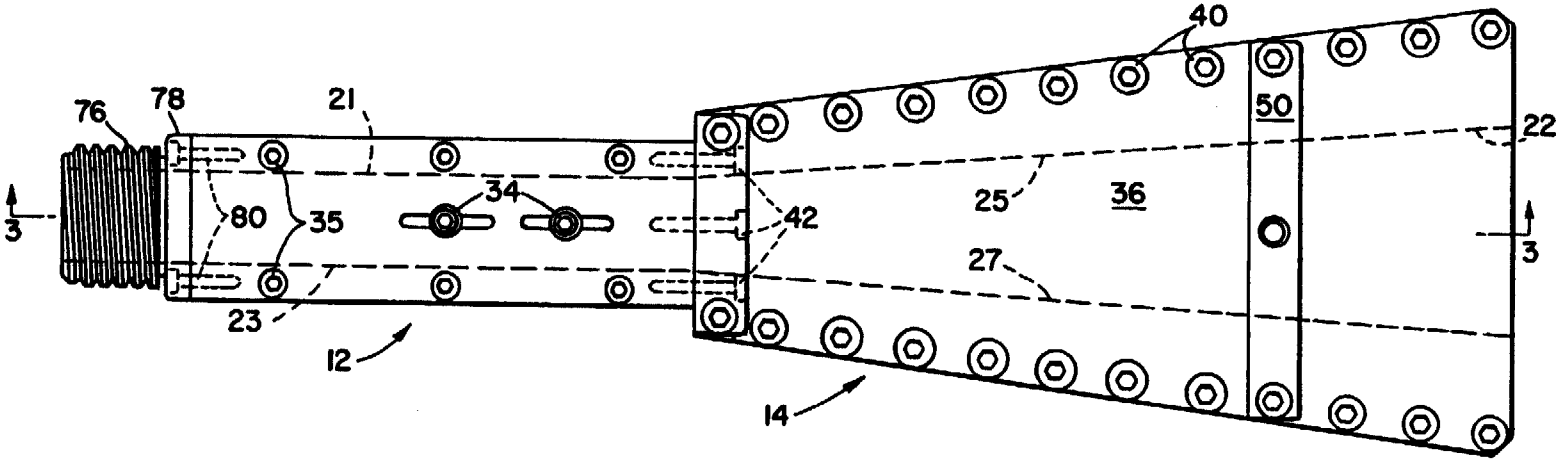
FIG. 2 is a top plan view of the fan nozzle of this invention.
Figures 3, 4, 5, 6, 7:
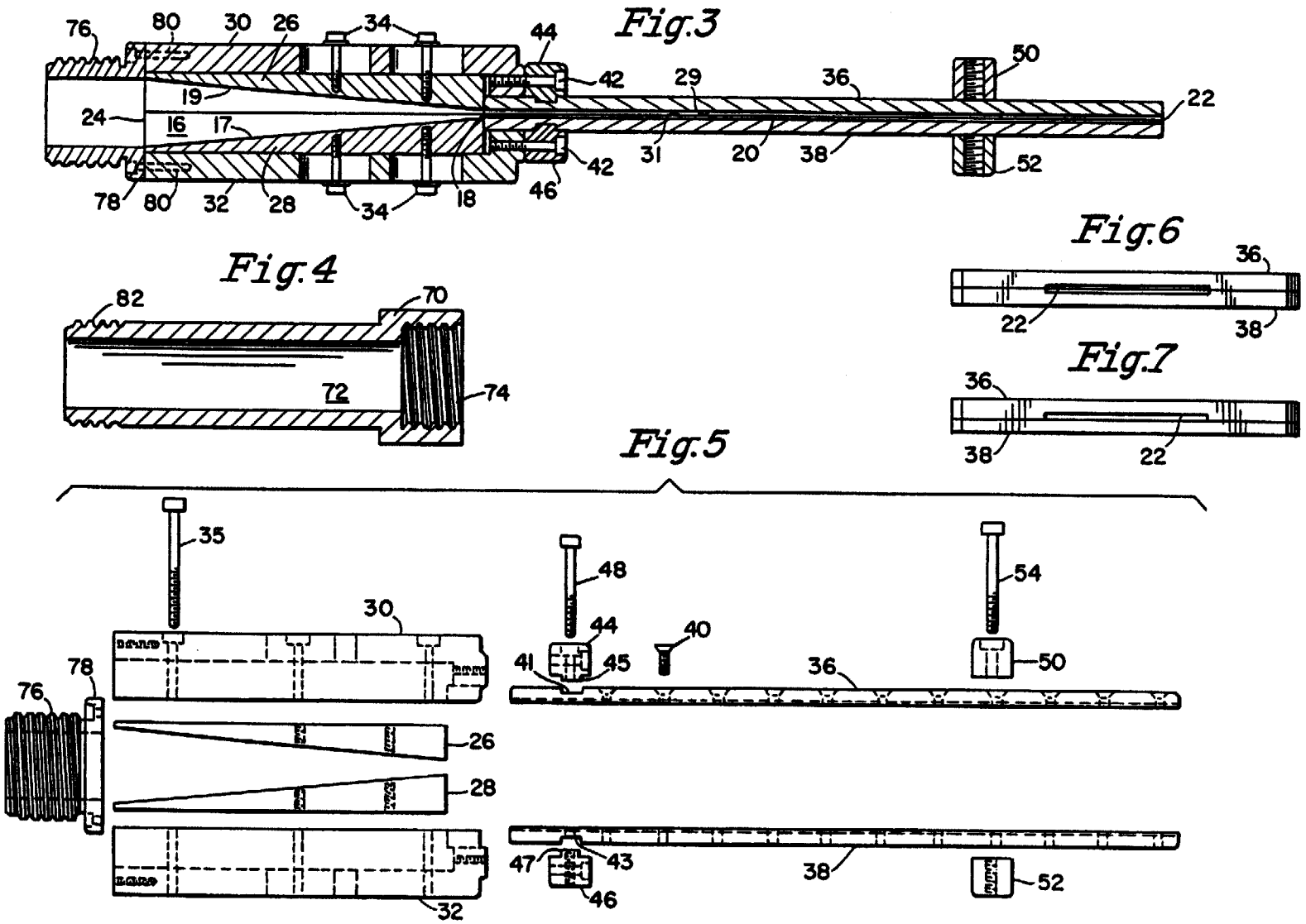
FIG. 3 is a longitudinal cross-section taken along lines 3—3 of the nozzle of FIG. 2.
FIG. 4 is a longitudinal cross-section through the center of the extension member shown in FIG. 1.
FIG. 5 is an exploded view illustrating how the parts of the fan nozzle are assembled.
FIG. 6 is an end-view of the fan nozzle.
FIG. 7 is an end-view of the fan nozzle having an alternative expansion channel assembly.

The fan nozzle of the present invention is shown in FIGS. 1, 2 and 3 and is designated by reference numeral 10. The fan nozzle includes a rectangular inlet converging section 12 and an outlet diverging or fan-shaped expansion portion 14 which directs the blast media to the surface to be cleaned in the form of a narrow fan-shaped stream. The mixture of pressurized air and blast media enters and exits fan nozzle 10 along a substantially longitudinal axis. The maintenance of flow of blast media along a substantially longitudinal passage through the nozzle is important especially if a very friable blast media is utilized since the substantially longitudinal passage of media through the fan nozzle reduces the contact of the blast media with the sides of the interior passages of the nozzle and, thus, prevents the breakup of the individual particles. With a blast media such as sodium bicarbonate which is very friable and relatively soft, the avoidance of turns and bends from the inlet to the outlet of the blast nozzle is important in maintaining both the mass of the individual sodium bicarbonate particles intact and the optimal velocity of the media particles from the nozzle.

Referring to FIG. 3, a longitudinal passageway is formed through fan nozzle 10 and comprises converging passage 16 in rectangular inlet portion 12, narrow rectangular throat or orifice 18 and the diverging fan-shaped channel 20 in expansion portion 14. In rectangular inlet section 12, passage 16 converges only in one direction between opposed flat converging *top and bottom* surfaces 17 and 19. As can be seen from FIG. 2 side surfaces 21 and 23 which also enclose passage 16 are parallel and do not converge from inlet 24 to orifice 18. Likewise the diverging or expansion channel 20 expands also along only a single direction between opposed diverging side surfaces 25 and 27 (FIG. 2). [Surfaces] *Top and bottom surfaces* 29 and 31 (FIG. 3) remain substantially parallel between orifice 18 and outlet 26. Thus, throughout expansion portion 14, the height of channel 20 or space between *top and bottom* surfaces 29 and 31 remains the same. While it may be possible to tolerate convergence and expansion to a small extent along a second or third direction, it is preferred to maintain the convergence and expansion along the single direction as shown in order to reduce turbulent flow and such configuration has proved to yield successful results using a lighter more friable blast media such as sodium bicarbonate. [Preferably, a plane passing through both] *Accordingly, the direction of convergence between top and bottom* surfaces 17 and 19 [will be] *is* perpendicular to [a plane passing through both] *the direction of divergence between* opposing side surfaces 25 and 27[, thus, providing for the direction of convergence to be perpendicular to the direction of divergence]. The blast media leaves the fan-shaped expansion portion 14 of blast nozzle 10 from outlet 22 shown in FIG. 1. The "hot spot" which is the area of maximum contact of the blast media on the surface being cleaned at a given moment is in the shape of a narrow oval which can be readily ascertained by the user and allows for efficient cleaning as the hot spot is moved along the targeted surface by the operator. Since the perimeter to area ratio of the fan nozzle outlet is greater than that for the round nozzle, a larger hot spot is formed as the media expands from the outlet for a given outlet area and, thus, less time is needed for stripping. The flat oval shape of the hot spot provided by the fan nozzle also lessen the need for overlap of stripping action.

An important feature of the fan nozzle of this invention is the length of passage 16. It has been found necessary in order to yield acceptable productivity to make the length of passage 16 within inlet portion 12 over twice as long as the diameter of the supply hose or inlet 24 of fan nozzle 10. Preferably the length of passage 16 is at least 4 times the diameter of the supply hose. This length to diameter ratio is important in providing homogenization of the blast media throughout the pressurized air stream and the passage of fan nozzle 10, serves to increase the velocity of the blast media from outlet 22 of fan nozzle 10 and, allows for a reduced convergence angle from inlet 24 to orifice 18 to be used, thus, providing for more stream-line and less turbulent flow of blast media. Mass loss is reduced and productivity, i.e., volume of coating removed per time per media flow rate, for cleaning the targeted surface is vastly improved.

Another important feature of the blast nozzle of the present invention is its modular structure. Referring to FIGS. 3 and 5, converging passage 16 is formed by opposed upper and lower ramps 26 and 28 which are releasably secured to juxtaposed hollow inlet body blocks 30 and 32 which form the rectangular inlet portion 12 of fan nozzle 10. Ramps 26 and 28 are simply triangular-shaped blocks which as shown in FIGS. 3 and 5 are attached to inlet body blocks 30 and 32, respectively, by screws 34. Thus, to change for different blast media or operating conditions, ramps 26 and 28 can be released from the inlet body blocks and different ramps 26 and 28 can again be releasably secured thereto. Hollow inlet body blocks 30 and 32 are secured together by screws 35. Inlet ramps 26 and 28 may be made of a harder, more abrasion resistant material than body blocks 30 and 32.

The diverging or expansion fan-shaped portion 14 also has a modular structure comprising separate juxtaposed upper fan-shaped block 36 and a lower fan-shaped block 38. These separate fan-shaped blocks are releasably attached and secured together by means of screws 40. The fan-shaped blocks are also releasably secured to inlet blocks 30 and 32 by upper and lower reinforcement blocks 44 and 46 which include respective tongues 45 and 47 which engage grooves 41 and 43 in fan-shaped blocks 36 and 38, respectively. Screws 42 secure the reinforcement blocks 44 and 46 to inlet blocks 30 and 32, respectively. Reinforcement blocks 44 and 46 are threaded also to accommodate holding screws 48 which secure blocks 44 and 46 to the upper and lower fan-shaped blocks 36 and 38 and blocks 36 and 38 to each other. The modular structure of fan-shaped blocks 36 and 38 allows these structures to be interchanged with different blocks 36 and 38 to change the expansion ratio of the blast nozzle and/or to change the angle of divergence to maintain optimal media velocity and accommodate differing media types, sizes, densities, etc., and on-site conditions, e.g., moisture, wind, etc. Optionally, placed along the expansion portion 14 on the exterior surfaces of fan-shaped blocks 36 and 38 are upper and lower accessory blocks 50 and 52 which provide means to attach a variety of accessories such as a handle attachment or water atomizer for dust control as set forth in commonly assigned, copending U.S. Ser. No. 958,552, filed Oct. 8, 1992. The upper and lower accessory blocks 50 and 52 can be threaded into the upper and lower fan-shaped blocks 36 and 38 by means of screws 54.

The expansion portion 14 formed from juxtaposed upper and lower fan-shaped blocks 36 and 38 form an enclosed passage or channel 20 for the expansion and acceleration of the blast media through outlet 22. Thus, as shown in FIGS. 3, 6 and 7, the upper and lower fan-shaped blocks 36 and 38 form and enclose channel 20 and outlet passage 22. Channel 20 and outlet passage 22 can be formed by shaping or machining both upper and lower fan-shaped blocks 36 and 38 as shown in FIG. 6 or, preferably, by shaping or machining only one of upper or lower blocks 36 and 38 as shown in FIG. 7 wherein channel 20 and outlet passage 22 is formed in upper block 36 only.

In order to insure that the blast media is thoroughly homogenized throughout the pressurized air stream entering inlet 24 of nozzle 10, the inlet passage 16 should be sufficiently long relative to the diameter of the inlet. It has been found that as the blast media and air stream pass from the dispensing device through the flexible supply hose to the inlet of the fan nozzle, centrifugal forces tend to concentrate the blast media along one quadrant of the supply hose and subsequently concentrates the blast media along only one quadrant of the passages through the blast nozzle 10. If this concentration is maintained at outlet 22 of the blast nozzle, it can be seen that the hot spot on the surface to be treated would be somewhat less than if the blast media was dispersed throughout the total passage 20 and outlet 22 of the blast nozzle. To insure complete dispersal of the blast media throughout the total area of the pressurized air stream and longitudinal passages in nozzle 10, it is preferable to add a flow straightening device 70, shown in FIG. 5 attached to inlet 24 of fan nozzle 10 as shown in FIG. 1. The flow straightening device is a pipe which includes a longitudinal passage 72 and is threaded onto the end of the inlet portion 12 to form a continuous longitudinal pathway from the supply hose to the outlet 22 of fan nozzle 10. Thus, female threads 74 on flow straightener 70 engage male threads 76 on inlet end cap 78 of the fan nozzle to secure the flow straightener thereto and to provide a contiguous relationship between passages 72 and 16. Inlet end cap 78 is attached to upper and lower inlet body blocks 30 and 32 by means of screws 80. The supply hose can be attached to the flow straightener by means of a clamp which can be threaded onto threads 82 of flow straightener 70. It has been found useful that the length to diameter ratio of flow straightener 70 be at least about 5. The flow straightener and use thereof is more specifically described in copending, commonly assigned application U.S. Ser. No. 979,301, filed Nov. 20, 1992. If the flow straightener device 70 is not used, the supply hose can be secured by clamp to threads 76 of inlet end cap 78. It is important that the diameter of inlet 24 is the same as the inside diameter of the supply hose (if flow straightener 70 is not used) or the same as the inside diameter of flow straightener 70 to avoid turbulent flow at the inlet of nozzle 10. Moreover, the total length of flow straightener 70 and inlet converging passage 16 can be used to satisfy both the length to diameter ratios required for the flow-straightener 70 and length of passage 16.

The supply hose 90 which feeds the blast nozzle 10 with the air and blast media mixture is made of a very thick and stiff rubber in order to withstand the abrasive action of the media passing therethrough. Consequently, the supply hose cannot be readily twisted and turned to orient the blast nozzle outlet 22 in different directions in cover the whole of the targeted surface. Accordingly, it is preferable to include a swivel joint 91 to connect blast nozzle 10 to the supply hose 90 and allow the blast nozzle 10 and outlet 22 to be rotated around the longitudinal axis of the nozzle so as to direct the outlet 22 to a useful orientation to cover all areas of the substrate. The type of swivel joint 91, per se, is not part of the invention and any commercial swivel joint can be utilized. It is important that the swivel joint provide a substantially unrestricted passage between the supply hose and the blast nozzle so as to not adversely affect the flow of blast media therethrough and to maintain a homogenous concentration of the blast media throughout the air stream and the total cross sectional area of the inlet of blast nozzle 10. Thus, all joints should preferably butt together to provide an interior passage which is uniform and does not include gaps which can yield eddys and turbulent flow of the air and blast media through the hose and blast nozzle. The swivel joint can be attached between supply hose 90 and flow straightener 70 as shown in FIG. 1 or attached to inlet 24 of nozzle 10. An example of a commercial swivel joint which has been utilized with the blast nozzle of the present invention is one manufactured by OPW Engineered Systems, Mason, Ohio, Aluminum Model 25 with a 1½ inch bore.

To operate efficiently, especially for blasting with sodium bicarbonate, it has been found useful to provide an expansion ratio of 1.0 to 5.0, preferably, 2.0 to about 4.0, which refers to the area of outlet 22 to the area of throat 18. More preferably, the expansion ratio will range from about 2.25 to about 2.7. The angle of divergence along the expansion portion 14 will range from about 0° (no expansion) to 15°, preferably, 2° to 9°. The ratio of the length of the expansion portion 14 to the diameter of the supply hose should range from about 3 to about 8. It appears the longer the expansion portion, the greater is the productivity, especially for larger blast media particles. The gap height which refers to the distance of channel 20 between fan-shaped blocks 36 and 38 will range from about 0.05 inch to about 0.5 inch although a ⅛ (0.125) inch gap has been found to be useful for blasting with sodium bicarbonate particles ranging in size of from 50 to 300 microns. By adjusting the gap height, the hot spot on the surface to be cleaned can be changed and the adjusting also allows the apparatus to be tunable for different applications as well as for different blast media. The width of orifice 18 is equal to the inside diameter of the blast hose.

The fan nozzle of the present invention can be used to remove coatings, grease, dirt and the like from any solid surface utilizing a variety of abrasive blast media. Preferably, the blast media will be water soluble in view of the advantages in cleanup as aforementioned. Nonlimiting examples of water soluble media which can be utilized include the alkali metal and alkaline earth metal salts such as the chlorides, carbonates, bicarbonates, sulfates, silicates, etc. The most preferred blast media are the alkali metal bicarbonates as exemplified by sodium bicarbonate. Also useful are sodium sesquicarbonate, natural sodium sesquicarbonate known as trona, sodium bicarbonate, sodium carbonate, potassium carbonate, magnesium carbonate, potassium bicarbonate, sodium chloride, sodium sulfate, barium sulfate, etc. It is important to note that by water soluble it is not meant completely water soluble as some salts and natural minerals such as trona may contain minor amount of insoluble materials. For example, trona may contain up to 10 wt. % insolubles.

Fan nozzle 10 if used for soft, friable blast media such a sodium bicarbonate can be formed from stainless steel and is substantially less expensive in material and construction to produce than nozzles used to blast with sand. Blasting with sand requires nozzles formed of hardened alloy steels or ceramics which must be molded by high pressure and cannot be readily formed into structures requiring minute detail.

EXAMPLE 1

Sodium bicarbonate blast media having an average diameter of 80 microns was utilized to strip an epoxy paint coated on steel at a thickness of about 12–14 mils with a standard round nozzle and again with the fan nozzle of the present invention. The amount of paint stripped defined as mil sq. ft. per minute of paint removed relative to the flow rate of the sodium bicarbonate in pounds per minute was measured and compared using the different blast nozzles in which the sodium bicarbonate was dry blasted with air at 60 psi.

The standard round nozzle which was utilized was a round nozzle number 8 having a 2 inch long inlet, a 0.5 inch diameter throat and a 0.75 inch diameter outlet. The expansion ratio of the round nozzle equaled 2.25.

The fan nozzle which was utilized had a converging inlet length (ramp length of 6 in.), an orifice width of 1.25 inch and a height of 0.158 inch. The expansion section was 10 in. long and expanded at an angle of 4.75°. The expansion ratio of the nozzle was 2.33. The outlet area for the round nozzle and fan nozzle was substantially equivalent.

Figure 8:
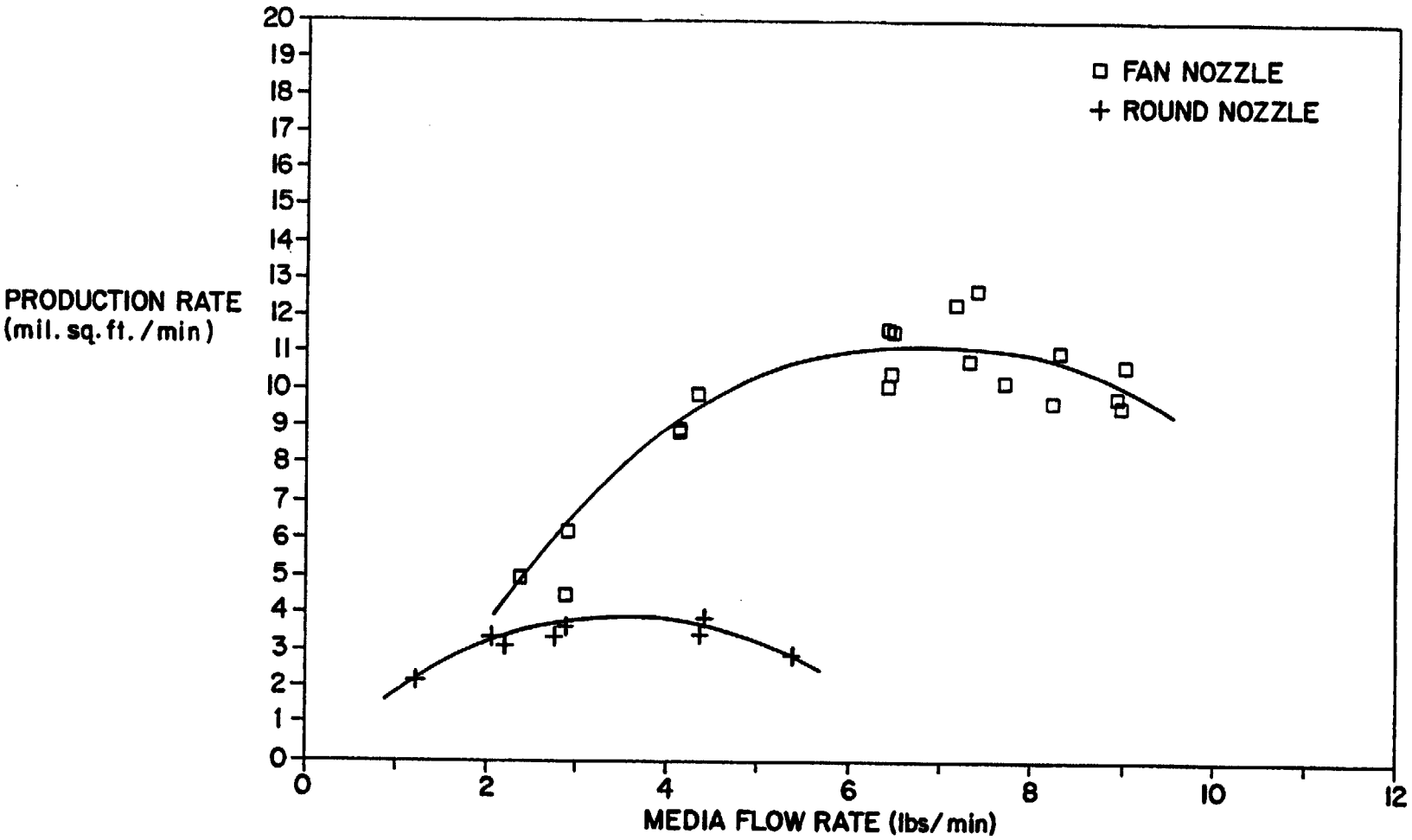
FIG. 8 is a graph comparing the performance of the fan nozzle of this invention with a standard round nozzle for blasting with 80 micron sodium bicarbonate.

The results of testing are set forth in FIG. 8 which comprises a graph of the production rate found with each of the respective nozzles. As can clearly be seen, at relatively low media flow rates of 3–6 lbs per minute, the production rate or volume of coating removed per time was substantially greater utilizing the fan nozzle of the present invention. Since sodium bicarbonate is more expensive than the sand blast media, flow rates of under 10 lbs per minute, preferably 1 to 8 lbs per minute and, more preferably, from 1 to 5 lbs per minute are required to make blasting with sodium bicarbonate economically competitive with that of sand. As can be seen, the productivity utilizing the fan nozzle, in particular, at rates of 3–6 lbs per minute was substantially greater than achieved with the use of the standard round nozzle.

EXAMPLE 2

Figure 9:
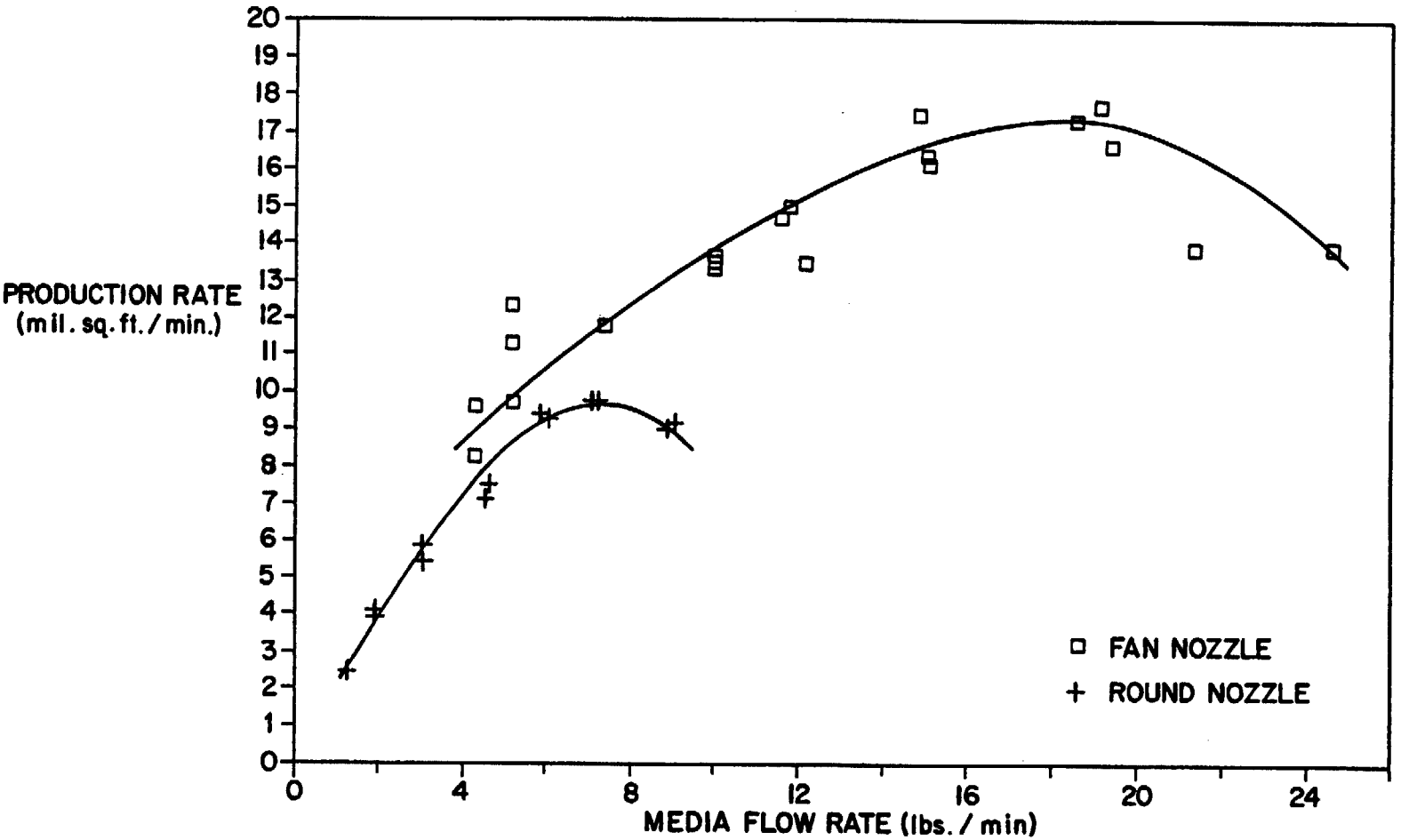
FIG. 9 is a graph comparing the performance of the fan nozzle of this invention with a standard round nozzle for blasting with 300 micron sodium bicarbonate.

Example 1 was repeated except that the sodium bicarbonate blast media had an average diameter of 300 micron. The results of testing are shown in graph form in FIG. 9.

Again, it can be seen that the production rate utilizing the fan nozzle of the present invention was better than the production rate utilizing the standard round nozzle. The productivity of the round nozzle appeared to peak at a flowrate about 6 lbs per minute. The productivity at the economically effective flow rates of 3–10 lbs per minute using the fan nozzle were substantially better than the productivity using the standard round nozzle at these lower flow rates.

What is claimed is:

1. A blast nozzle for cleaning a surface with a soft and friable abrasive blast media, comprising:

an inlet portion, an orifice and an outlet portion, said inlet portion containing a circular inlet for receiving a mixture of pressurized air and abrasive blast media and a converging inlet passage communicating with said circular inlet and being formed from at least a first pair of opposing flat *top and bottom* surfaces which converge to said orifice *and a first pair of opposing side surfaces*, said inlet passage converging substantially only by means of said first pair of opposing flat *top and bottom* surfaces to said orifice, said outlet portion comprising an outlet passage diverging from said orifice to an outlet for directing said blast media to said surface for cleaning, said outlet passage being formed from at least a second pair of opposing *side* surfaces which diverge from said orifice to said outlet *and a second pair of flat top and bottom surfaces*, said outlet passage diverging substantially only by means of said second pair of opposing *side* surfaces, [wherein a plane passing through both of said first pair of opposing flat surfaces is perpendicular to a plane passing through both of said second pair of opposing surfaces,]

said inlet passage having a length from said inlet to said orifice which is at least twice the diameter of said inlet, and said inlet passage, said orifice and said outlet passage forming a substantially longitudinal passage from said inlet to said outlet.

2. The blast nozzle of claim 1 wherein said inlet passage has a length of at least about 4 times the diameter of said inlet.

3. The blast nozzle of claim 1 wherein said [outlet passage is further formed by a third] *second* pair of [opposing] *flat top and bottom* surfaces [which] do not diverge from each other from said orifice to said outlet.

4. The blast nozzle of claim 1 wherein *a ratio of* area of said [orifice and] *outlet to* area of said [outlet have a ratio] *orifice is* from about 1.0 to 5.0.

5. The blast nozzle of claim 4 wherein said ratio ranges from about 2.0 to 4.0.

6. The blast nozzle of claim 4 wherein said ratio ranges from about 2.25 to 2.7.

7. The blast nozzle of claim 4 wherein said outlet passage diverges at an angle of from about 0° to 15° from said orifice to said outlet.

8. The blast nozzle of claim 7 wherein said outlet passage diverges at an angle of from about 2° to 9° from said orifice to said outlet.

9. The blast nozzle of claim 1 wherein said inlet portion is rectangular and wherein said first pair of opposing flat [sides] *top and bottom surfaces* are provided on a respective pair of releasably secured opposed triangular ramps.

10. The blast nozzle of claim 1 wherein said inlet and outlet portion are formed of stainless steel.

11. The blast nozzle of claim 1 wherein said orifice is rectangular.

12. The blast nozzle of claim 11 wherein said [inlet passage is further formed by a fourth] *first* pair of opposing side surfaces [which] do not converge from said inlet to said orifice, said first pair of opposing flat *top and bottom* surfaces being spaced at said orifice, said [fourth] *first* pair of opposing side surfaces being spaced at said orifice, said rectangular orifice being formed by said spacing of said first pair of opposing flat [sides] *top and bottom surfaces* at said orifice and said spacing of said [fourth] *first* pair of opposing side surfaces at said orifice, the space between said [fourth] *first* pair of opposing side surfaces at said orifice being equal to the diameter of said inlet.

13. A blast nozzle for cleaning a surface with a soft and friable abrasive blast media, comprising:

an inlet portion, an orifice and an outlet portion, said inlet portion containing a circular inlet for receiving a mixture of pressurized air and abrasive blast media and a converging inlet passage communicating with said circular inlet and being formed from at least a first pair of opposing flat surfaces which converge to said orifice, said inlet passage converging substantially only by means of said first pair of opposing flat surfaces to said orifice, said outlet portion comprising an outlet passage diverging from said orifice to an outlet for directing said blast media to said surface for cleaning, said outlet passage being formed from at least a second pair of opposing surfaces which diverge from said orifice to said outlet, said outlet passage diverging substantially only by means of said second pair of opposing surfaces, wherein said inlet portion is rectangular and wherein said first pair of opposing flat [sides] *surfaces* are provided on a respective pair of releasably secured opposed triangular ramps.

14. The blast nozzle of claim 13 wherein said outlet passage is formed in juxtaposed upper and lower blocks which contain said outlet passage therebetween, said upper and lower blocks fully enclosing said outlet passage.

15. The blast nozzle of claim 14 wherein said outlet passage is formed into each of said upper and lower blocks.

16. The blast nozzle of claim 14 wherein said outlet passage is formed in only one of said upper and lower blocks.

17. The blast nozzle of claim 14 wherein said upper and lower blocks are releasably secured to said inlet portion.

18. The blast nozzle of claim 13 wherein said inlet passage has a length from said inlet to said orifice which is at least twice the diameter of said inlet.

19. The blast nozzle of claim 13 wherein said inlet passage has a length from said inlet to said orifice which is at least 4 time the diameter of said inlet.

[20. The blast nozzle of claim 13 wherein a plane passing through both of said first pair of opposing flat surfaces is perpendicular to a plane passing through both of said second pair of opposing surfaces.]

21. The blast nozzle of claim 13 wherein *a ratio of* area of said [orifice and] *outlet to* area of said [outlet have a ratio ] *orifice is* from about 2.0 to 4.0.

22. The blast nozzle of claim 13 wherein said inlet portion and said orifice are rectangular.

* * * * *